US012515323B2

(12) United States Patent
Paolini et al.

(10) Patent No.: US 12,515,323 B2
(45) Date of Patent: Jan. 6, 2026

(54) LIMITING ARM FORCES AND TORQUES

(71) Applicant: Boston Dynamics, Inc., Waltham, MA (US)

(72) Inventors: Robert Eugene Paolini, Cambridge, MA (US); Alfred Anthony Rizzi, Cambridge, MA (US); Navid Aghasadeghi, Boston, MA (US); Alex Khripin, Waltham, MA (US)

(73) Assignee: Boston Dynamics, Inc., Waltham, MA (US)

( * ) Notice: Subject to any disclaimer, the term of this patent is extended or adjusted under 35 U.S.C. 154(b) by 0 days.

(21) Appl. No.: 18/646,099

(22) Filed: Apr. 25, 2024

(65) Prior Publication Data

US 2024/0269838 A1    Aug. 15, 2024

Related U.S. Application Data

(63) Continuation of application No. 17/306,990, filed on May 4, 2021, now Pat. No. 11,999,059.

(Continued)

(51) Int. Cl.
*B25J 9/16* (2006.01)

(52) U.S. Cl.
CPC ............. *B25J 9/163* (2013.01); *B25J 9/1633* (2013.01); *B25J 9/1674* (2013.01)

(58) Field of Classification Search
CPC ........ B25J 9/163; B25J 9/1633; B25J 9/1674; B25J 9/162; B62D 57/032; G05B 2219/40343; G05B 2219/42289
See application file for complete search history.

(56) References Cited

U.S. PATENT DOCUMENTS

| 5,550,953 | A | 8/1996 | Seraji |
| 7,313,463 | B2 | 12/2007 | Herr et al. |

(Continued)

FOREIGN PATENT DOCUMENTS

| CN | 106903692 | * | 6/2017 |
| JP | 2005088164 | | 4/2005 |

(Continued)

OTHER PUBLICATIONS

Ferrolho et al., "Residual force polytope: Admissible task-space forces of dynamic trajectories". Rob Auton Sys. Aug. 1, 2021;142: 103814 (12 pgs.).

(Continued)

*Primary Examiner* — Abby Lin
*Assistant Examiner* — Danielle M Jackson
(74) *Attorney, Agent, or Firm* — Knobbe, Martens, Olson & Bear, LLP

(57) ABSTRACT

A computer-implemented method includes generating a joint-torque-limit model for the articulated arm based on allowable joint torque sets corresponding to a base pose of the base. The method also include receiving a first requested joint torque set for a first arm pose of the articulated arm and determining, using the joint-torque-limit model, an optimized joint torque set corresponding to the first requested joint torque set. The method also includes receiving a second requested joint torque set for a second arm pose of the articulated arm and generating an adjusted joint torque set by adjusting the second requested joint torque set based on the optimized joint torque set. The method also includes sending the adjusted joint torque set to the articulated arm.

20 Claims, 12 Drawing Sheets

Related U.S. Application Data

(60) Provisional application No. 63/127,395, filed on Dec. 18, 2020.

(56) References Cited

U.S. PATENT DOCUMENTS

| | | | |
|---|---|---|---|
| 7,330,775 | B2 | 2/2008 | Orita et al. |
| 7,658,245 | B2 | 2/2010 | Nakamura et al. |
| 8,942,848 | B2 | 1/2015 | Pratt et al. |
| 9,120,227 | B2 | 9/2015 | Zheng et al. |
| 9,314,934 | B2 | 4/2016 | Whitney |
| 9,389,598 | B2 | 7/2016 | Hodgins et al. |
| 9,440,353 | B1 | 9/2016 | da Silva et al. |
| 9,969,082 | B1 | 5/2018 | Berard et al. |
| 9,987,745 | B1 | 6/2018 | Berard et al. |
| 10,065,306 | B2 | 9/2018 | Isobe |
| 10,493,617 | B1 | 12/2019 | Holson et al. |
| 11,203,120 | B1 | 12/2021 | Hill |
| 11,931,898 | B2 | 3/2024 | Berard et al. |
| 11,999,059 | B2 | 6/2024 | Paolini et al. |
| 2006/0033462 | A1 | 2/2006 | Moridaira |
| 2006/0129278 | A1 | 6/2006 | Sugiyama et al. |
| 2009/0173560 | A1 | 7/2009 | Nakamoto et al. |
| 2009/0295324 | A1 | 12/2009 | Shim et al. |
| 2010/0143089 | A1 | 6/2010 | Hvass et al. |
| 2012/0130540 | A2 | 5/2012 | Stilman |
| 2014/0249670 | A1 | 9/2014 | Yamane |
| 2015/0088469 | A1 | 3/2015 | Nagarajan et al. |
| 2015/0343633 | A1 | 12/2015 | Gouaillier et al. |
| 2016/0059408 | A1 | 3/2016 | Isobe |
| 2016/0288324 | A1 | 10/2016 | Bradski et al. |
| 2017/0057095 | A1 | 3/2017 | Oestergaard et al. |
| 2019/0009410 | A1 | 1/2019 | Radrich |
| 2019/0134821 | A1 | 5/2019 | Patrick et al. |
| 2020/0061835 | A1 | 2/2020 | Haddadin et al. |
| 2020/0368911 | A1 | 11/2020 | Takeuchi |
| 2021/0323148 | A1 | 10/2021 | Matsuda et al. |
| 2021/0387332 | A1* | 12/2021 | Xu .................. B25J 13/088 |
| 2022/0193893 | A1 | 6/2022 | Paolini et al. |
| 2023/0008146 | A1 | 1/2023 | Spenninger |
| 2024/0189999 | A1 | 6/2024 | Berard et al. |

FOREIGN PATENT DOCUMENTS

| | | |
|---|---|---|
| JP | 2006051564 | 2/2006 |
| JP | 2016049616 | 4/2016 |
| KR | 20130033920 | 4/2013 |
| WO | WO 2022/133016 | 1/2022 |
| WO | WO 2022/140199 | 6/2022 |

OTHER PUBLICATIONS

Moubarak et al., "Adaptive manipulation of a hybrid mechanism mobile robot". IEEE International Symposium on Robotics and Sensors Environments (ROSE), Sep. 17, 2011: 113-118.

Rehman et al., "Towards a multi-legged mobile manipulator". 2016 Inter'l Conf Robot Autom. (ICRA) May 16, 2016 (pp. 3618-3624), IEEE.

International Search Report and Written Opinion dated May 23, 2022 for Application No. PCT/US2021/063682 (14 pgs.).

* cited by examiner

LIMITING ARM FORCES AND TORQUES

CROSS REFERENCE TO RELATED APPLICATIONS

This application is a continuation of U.S. Non-Provisional application Ser. No. 17/306,990, filed May 4, 2021, which claims priority under 35 U.S.C. § 119(e) to U.S. Provisional Application No. 63/127,395, filed on Dec. 18, 2020. The disclosure of this prior application is considered part of the disclosure of this application and is hereby incorporated by reference in its entirety.

TECHNICAL FIELD

This disclosure relates to limiting arm forces and torques in a robot.

BACKGROUND

Robotic arms are increasingly being used in constrained or otherwise restricted environments to perform a variety of tasks or functions. In some implementations, robotic arms are provided on mobile bases, such as quadruped or biped robot bases. These robotic arms often need to complete tasks without disrupting or destabilizing the base of the robot. As mobile robots with robotic arms become more prevalent, there is a need for arm task planning that manages torques applied by the robotic arm to maintain stability of the robot base.

SUMMARY

An aspect of the disclosure provides a computer-implemented method that, when executed by data processing hardware of a robot including an articulated arm attached to a base, causes the data processing hardware to perform operations. The operations include generating a joint-torque-limit model for the articulated arm based on allowable joint torque sets corresponding to a current configuration of the base. The operations also include receiving a first requested joint torque set for a first arm pose of the articulated arm. The operations further include determining, using the joint-torque-limit model, an optimized joint torque set corresponding to the first requested joint torque set. The operations also include receiving a second requested joint torque set for a second arm pose of the articulated arm. The operations further include generating an adjusted joint torque set by adjusting the second requested joint torque set based on the optimized joint torque set. The operations also include sending the adjusted joint torque set to the articulated arm. This aspect of the disclosure may include one or more of the following optional features.

In some implementations, generating the joint-torque-limit model includes determining an allowable wrench force set including allowable wrench forces for the robot base in the current configuration and determining the allowable joint torque sets for the articulated arm based on the allowable wrench force. In some examples, the operations further include determining an allowable arm force set including arm forces that comply with the allowable wrench force set and determining the allowable joint torque sets based on the allowable arm force set. In some configurations, the allowable wrench forces satisfy a base stability metric.

In some configurations, determining the optimized joint torque set includes projecting the first requested joint torque set to the joint-torque-limit model. In some examples, the operations further include determining local information for the joint-torque-limit model at the optimized joint torque set. In some examples, generating the adjusted joint torque set includes obtaining the optimized joint torque set and local information, executing a coarse torque adjustment using the local information to project the requested joint torque set to a coarse adjustment joint torque set, and executing a fine joint torque adjustment to project the coarse adjustment joint torque set to the joint-torque-limit model. In some examples, determining the optimized joint torque set includes executing a non-linear optimization and generating the adjusted joint torque set includes executing a linear optimization.

Another aspect of the disclosure provides a system for a robot including an articulated arm attached to a base. The system includes data processing hardware and memory hardware in communication with the data processing hardware. The memory hardware storing instructions that when executed on the data processing hardware cause the data processing hardware to perform operations. The operations include generating a joint-torque-limit model for the articulated arm based on allowable joint torque sets corresponding to a current configuration of the base. The operations also include receiving a first requested joint torque set for a first arm pose of the articulated arm. The operations also include determining, using the joint-torque-limit model, an optimized joint torque set corresponding to the first requested joint torque set. The operations also include receiving a second requested joint torque set for a second arm pose of the articulated arm. The operations further include generating an adjusted joint torque set by adjusting the second requested joint torque set based on the optimized joint torque set. The operations also include sending the adjusted joint torque set to the articulated arm.

This aspect of the disclosure may include one or more of the following optional features. In some examples, generating the joint-torque-limit model includes determining an allowable wrench force set including allowable wrench forces for the robot base in the current configuration and determining the allowable joint torque sets for the articulated arm based on the allowable wrench force. In some examples, the operations further include determining an allowable arm force set including arm forces that comply with the allowable wrench force set and determining the allowable joint torque sets based on the allowable arm force set. In some configurations, the allowable wrench forces satisfy a base stability metric.

In some implementations, determining the optimized joint torque set includes projecting the first requested joint torque set to the joint-torque-limit model. In some examples, the operations further include determining local information for the joint-torque-limit model at the optimized joint torque set. In some examples, generating the adjusted joint torque set includes obtaining the optimized joint torque set and local information, executing a coarse torque adjustment using the local information to project the requested joint torque set to a coarse adjustment joint torque set, executing a fine joint torque adjustment to project the coarse adjustment joint torque set to the joint-torque-limit model. In some examples, determining the optimized joint torque set includes executing a non-linear optimization and generating the adjusted joint torque set includes executing a linear optimization.

Another aspect of the disclosure provides computer-implemented method that, when executed by data processing hardware of a robot including an articulated arm attached to a base, causes the data processing hardware to perform operations. The operations include obtaining a requested joint torque set for an arm pose of the articulated arm. The operations also include determining whether the articulated arm is in contact with an external object. The operations also include, when the articulated arm is not in contact with an external object, executing the requested joint torque set at the articulated arm. The operations also include, when the articulated arm is in contact with an external object, adjusting the requested joint torque set for the arm pose and executing the adjusted joint torque set at the articulated arm.

This aspect of the disclosure includes one or more of the following optional features. In some implementations, determining whether the articulated arm is in contact with an external object includes receiving a commanded joint torque set including commanded joint torque values for the arm pose of the articulated arm, determining an expected joint torque set including expected joint torque values for the arm pose of the articulated arm, generating a filtered joint torque set including filtered joint torque values for the arm pose based on the commanded joint torque values and the expected joint torque values, and determining that the articulated arm is in contact with an external object when at least one of the filtered joint torque values exceeds a filtered joint torque value threshold.

In some configurations, determining the expected joint torque set includes a previously measured joint torque set corresponding to the arm pose. In some examples, the operations further include determining an optimized joint torque set corresponding to the requested joint torque set using a joint-torque-limit model and generating the adjusted joint torque set by adjusting the requested joint torque set based on the optimized joint torque set.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Many robots include multi-axis articulable appendages configured to execute complex movements for completing tasks, such as material handling or industrial operations (e.g., welding, gluing, and/or fastening). These appendages, also referred to as manipulators, typically include an end-effector or hand attached at the end of a series appendage segments or portions, which are connected to each other by one or more appendage joints. The appendage joints cooperate to configure the appendage in a variety of poses P within a space associated with the robot. Here, the term "pose" refers to the position and orientation of the appendage. For example, the pose P of the appendage may be defined by coordinates (x, y, z) of the appendage within a workspace (Cartesian space), and the orientation may be defined by angles ($\Theta \neg x, \Theta \neg y, \Theta z$) of the appendage within the workspace. In use, applications of force to the robot appendage may create a counteracting force on the robot base, resulting in the robot base being destabilized.

Figure 1A:
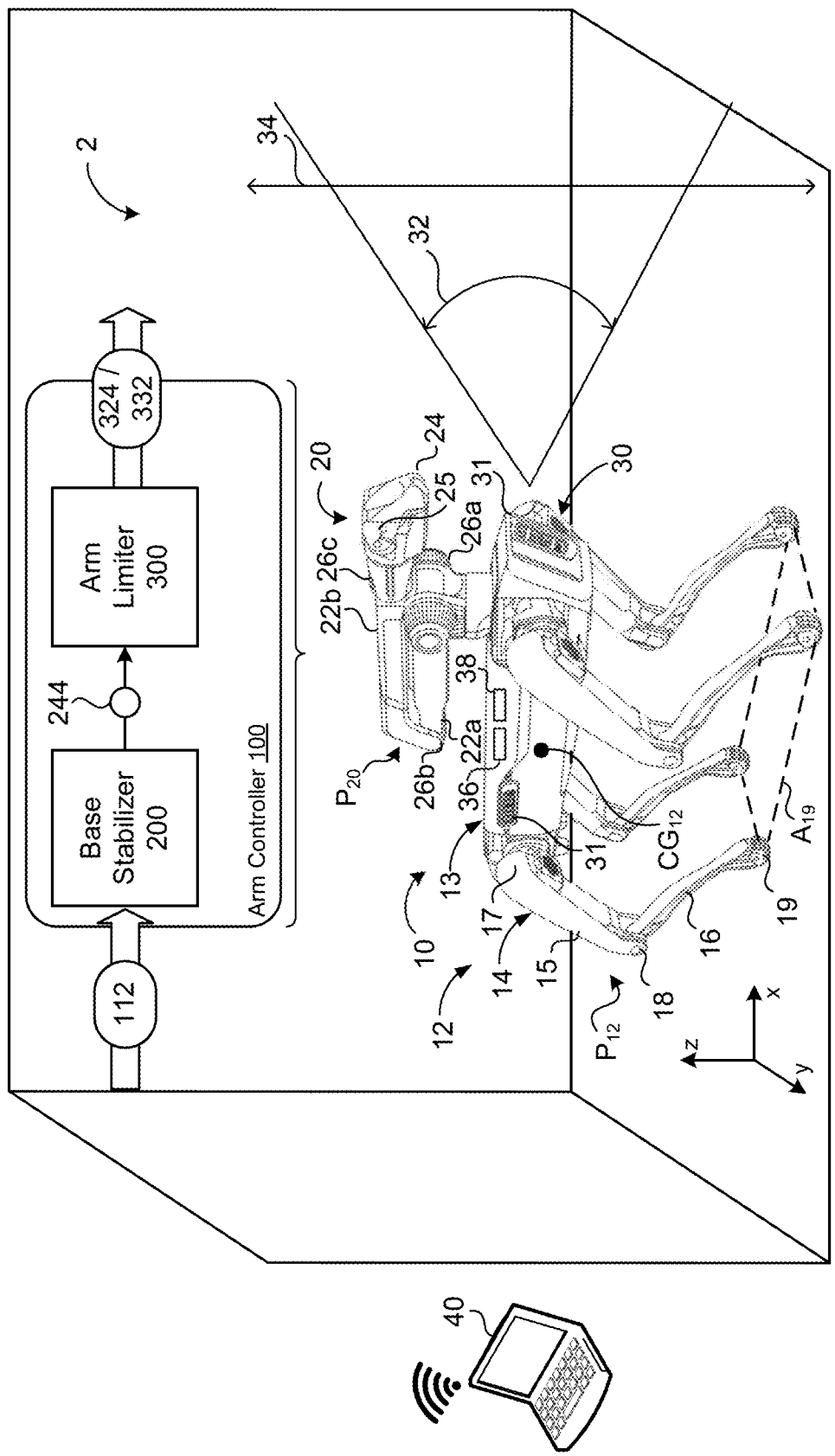
FIG. 1A is a schematic view of an example robot executing an arm controller for managing joint torques in an arm of a robot.

Referring to FIG. 1, a robot or robotic device 10 includes a base 12 having a body 13 and two or more legs 14. Each leg 14 may have an upper leg portion 15 and a lower leg portion 16. The upper leg portion 15 may be attached to the body 13 at an upper joint 17 (i.e., a hip joint) and the lower leg portion 16 may be attached to the upper leg portion 15 by an intermediate joint 18 (i.e., a knee joint). Each leg 14 further includes a contact pad or foot 19 disposed at a distal end of the lower leg portion 16, which provides a ground-contacting point for the base 12 of the robot 10. As discussed in greater detail below, the positions of the feet 19 of the robot base 12 cooperate to define a ground-contacting area A19 for the robot base 12, which can be adjusted to affect stability of the robot base 12. For example, moving the feet 19 closer together reduces the ground-contacting area A19 and minimizes stability, while moving the feet 19 farther apart increases the ground-contacting area A¬19 and stability.

In some implementations, the robot 10 further includes one or more appendages, such as an articulated arm 20 or manipulator disposed on the body 13 and configured to move relative to the body 13. Moreover, the articulated arm 20 may be interchangeably referred to as a manipulator, an appendage arm, or simply an appendage. In the example shown, the articulated arm 20 includes two arm portions 22, 22a, 22b rotatable relative to one another and the body 13. However, the articulated arm 20 may include more or less arm portions 22 without departing from the scope of the present disclosure. A third arm portion 24 of the articulated arm, referred to as an end effector 24 or hand 24, may be interchangeably coupled to a distal end of the second portion 22b of the articulated arm 20 and may include one or more actuators 25 for gripping/grasping objects.

The articulated arm 20 includes a plurality of joints 26, 26a-26c disposed between adjacent ones of the arm portions 22, 24. In the example shown, the first arm portion 22a is attached to the body 13 of the robot 10 by a first two-axis joint 26a, interchangeably referred to as a shoulder 26a. A single-axis joint 26b connects the first arm portion 22a to the second arm portion 22b. The second joint 26b includes a single axis of rotation and may be interchangeably referred to as an elbow 26b of the articulated arm 20. A second two axis joint 26c connects the second arm portion 22b to the hand 24, and may be interchangeably referred to as a wrist 26c of the articulated arm 20. Accordingly, the joints 26 cooperate to provide the articulated arm 20 with five degrees of freedom (i.e., five axes of rotation). While the illustrated example shows a five-axis articulated arm 20, the principles of the present disclosure are applicable to robotic arms having any number of degrees of freedom.

The robot 10 also includes a vision system 30 with at least one imaging sensor or camera 31, each sensor or camera 31 capturing image data or sensor data of the environment 2 surrounding the robot 10 with an angle of view 32 and within a field of view 34. The vision system 30 may be configured to move the field of view 34 by adjusting the angle of view 32 or by panning and/or tilting (either independently or via the robot 10) the camera 31 to move the field of view 34 in any direction. Alternatively, the vision system 30 may include multiple sensors or cameras 31 such that the vision system 30 captures a generally 360-degree Field of view around the robot 10. The camera(s) 31 of the vision system 30, in some implementations, include one or more stereo cameras (e.g., one or more RGBD stereo cameras). In other examples, the vision system 30 includes one or more radar sensors such as a scanning light-detection and ranging (LIDAR) sensor, or a scanning laser-detection and ranging (LADAR) sensor, a light scanner, a time-of-flight sensor, or any other three-dimensional (3D) volumetric image sensor (or any such combination of sensors). The vision system 30 provides image data or sensor data derived from image data captured by the cameras or sensors 31 to the data processing hardware 36 of the robot 10. The data processing hardware 36 is in digital communication with memory hardware 38 and, in some implementations, includes a remote system. The remote system may be a single computer, multiple computers, or a distributed system (e.g., a cloud environment) having scalable/elastic computing resources and/or storage resources.

An arm controller 100 of the robot 10 controls moving the articulated arm 20 between arm poses P20. For instance, the articulated arm 20 may need to move from a start pose P20 to a target pose P20 when the robot 10 is performing a specific action. For instance, in a scenario when the robot 10 needs to open a door while navigating in an environment, the robot arm controller 100 will need to move the articulated arm 20 from a retracted pose P20 to a target pose P20 where the articulated arm 20 positions the end effector 24 to manipulate a door knob to open the door. The arm controller 100 may include a base stabilizer 200 and an arm limiter 300. The base stabilizer 200 is configured to receive base configuration data 112 and generate a model 232 (FIG. 2D) of acceptable arm torques that can be applied to the joints 26 of the arm 20 to maintain stability of the base 12. The base configuration data 112 may include leg configuration data 112a defining geometries of the legs 14 and body configuration data 112b defining the position and orientation of the robot body 13. Using the model of the acceptable arm torques, the arm limiter 300 may identify torque requests that would cause instability in the robot body 10 and determines maximum torque values that can be applied at each axis of the articulated arm 20 to maintain stability.

In the example shown, the robot 10 executes the arm controller 100 on the data processing hardware 36 of the robot. In some implementations, at least a portion of the arm controller 100 executes on a remote device 40 in communication with the robot 10. For instance, the model of the acceptable arm torques may be computed on a remote device and a control system executing on the robot 10 may receive the model and determine the limited torque requests using the model. Optionally, the arm controller 100 may execute on a remote device 40 and the remote device may control/instruct the robot 10 to move the articulated arm 20.

As discussed above, movements and poses of the robot appendage may be defined in terms of a robot workspace based on a Cartesian coordinate system. Alternatively, movements and poses of the robot appendage 20 may be described with respect to a joint space of the robot appendage. In the example of the robot 10 provided in FIG. 1A, the robot base 12 has six degrees of freedom, and hence, a six-dimensional joint space. Likewise, the robot 10 includes a six-dimensional robot wrench space representing a set of all wrenches that can be applied on the robot base 12 center of gravity CG12, including three-dimensional forces and three-dimensional torques. Appendages 14, 20 of the robot 10 may also be described in terms of a joint space, which refers to a space representing all possible combinations of joint configurations of a robot appendage, and is directly related to the number of degrees of freedom of the robot appendage. For instance, a robot arm having n degrees of freedom will have an n¬-dimensional joint space. In the present example, the articulated arm has five degrees of freedom defining a five-dimensional joint space.

Figure 1B:
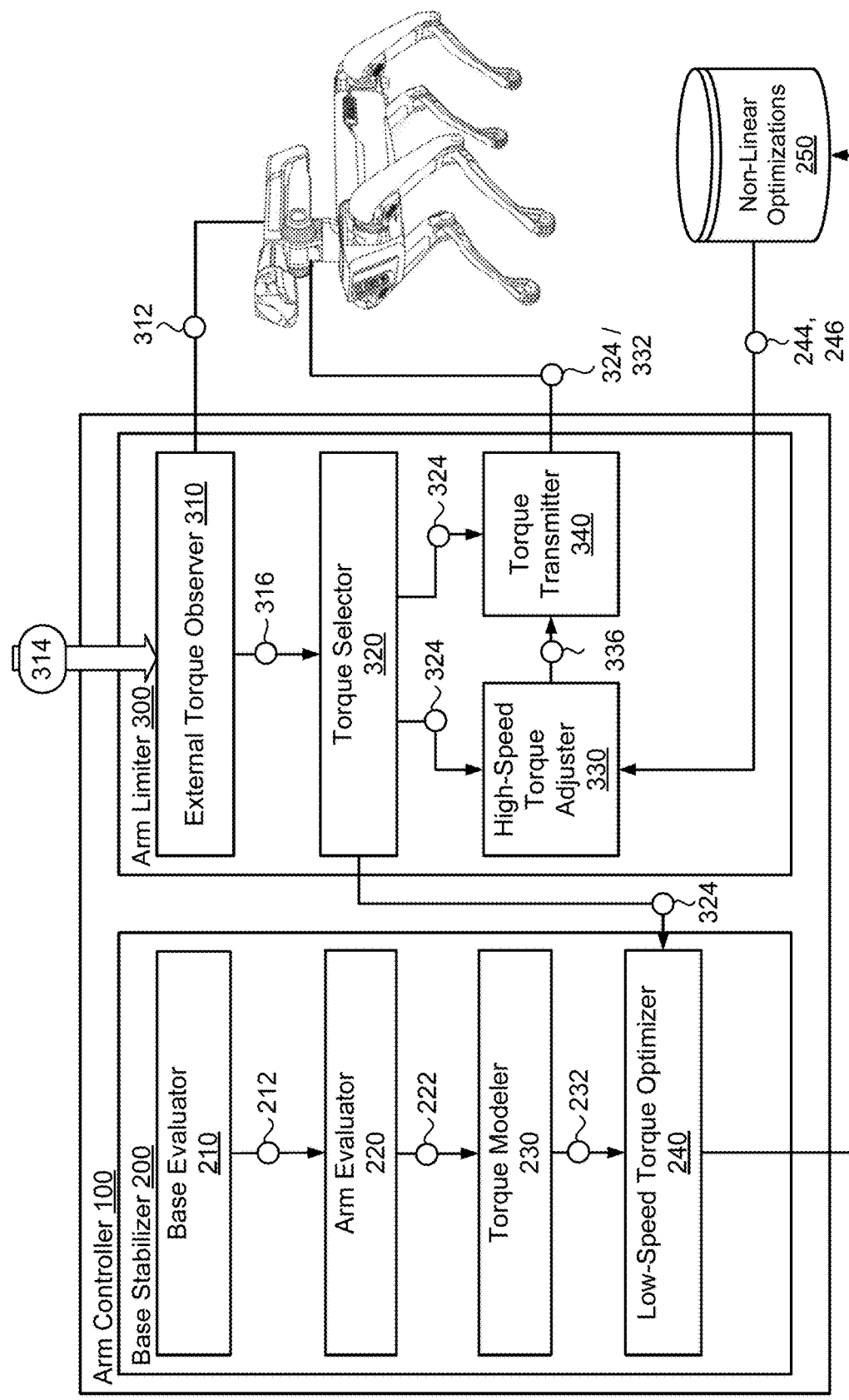
FIG. 1B is a schematic view of the arm controller of FIG. 1A.
Figure 2A:
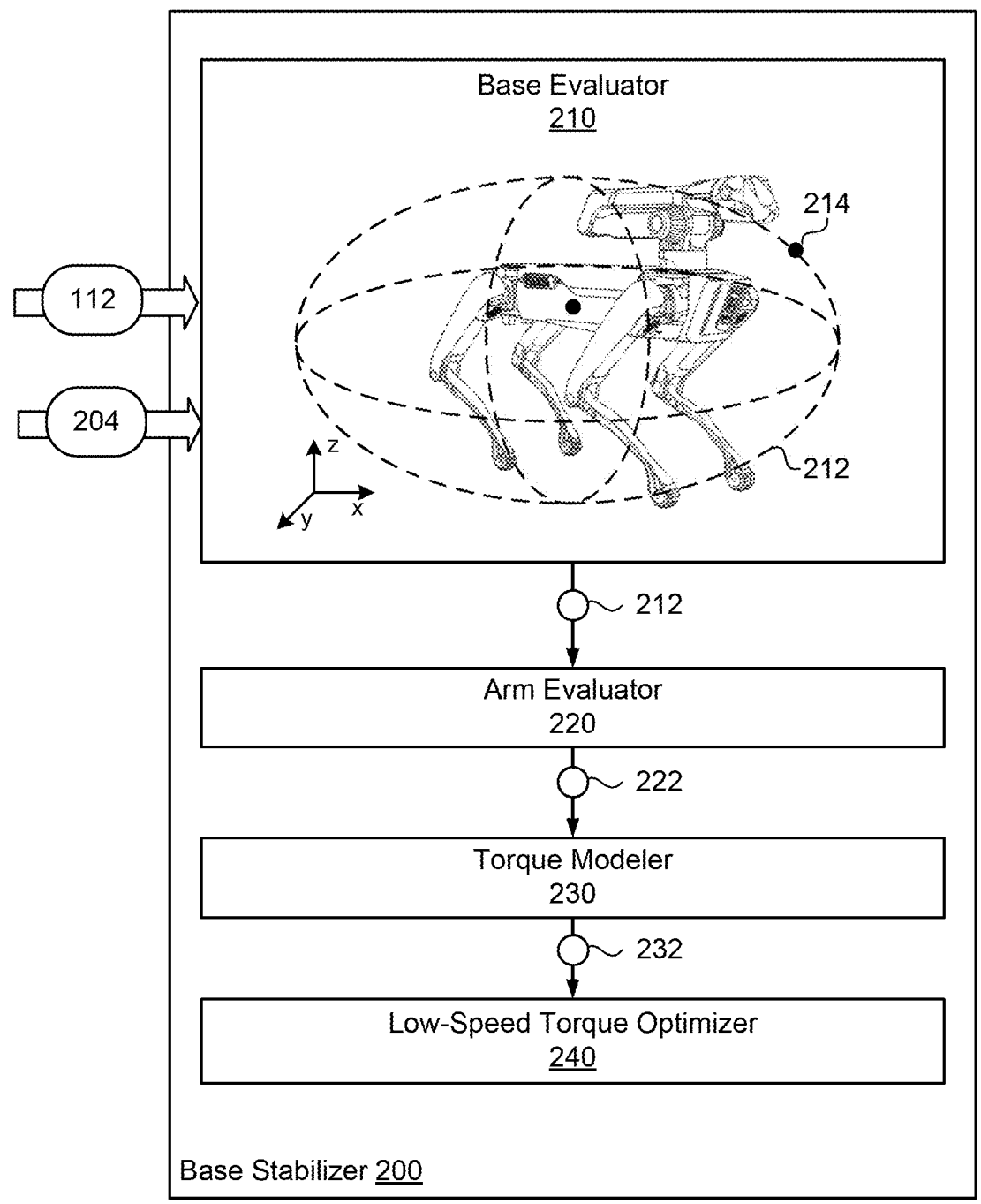
FIG. 2A is a schematic view showing a base evaluator of a base stabilizer of the arm controller of FIG. 1A.

With references to FIGS. 1B and 2A, the base stabilizer 200 includes a base evaluator 210 and an arm evaluator 220 that cooperate to calculate allowable arm joint torques 222 for a given set of base configuration data 112. The base stabilizer 200 further includes a torque modeler 230, which generates a joint-torque-limit model 232 based on the allowable arm joint torques 222 calculated by the base evaluator 210 and the arm evaluator 220. A low-speed torque optimizer 240 optimizes a requested joint torque set 324 to generate a corresponding optimized joint torque set 244 for the base configuration data 112 of the current configuration (e.g., base pose) P12. The base stabilizer 200 may execute one or more of the modules 210, 220, 230, 240 at a relatively low speed (e.g., 200 Hz).

Figure 3A:
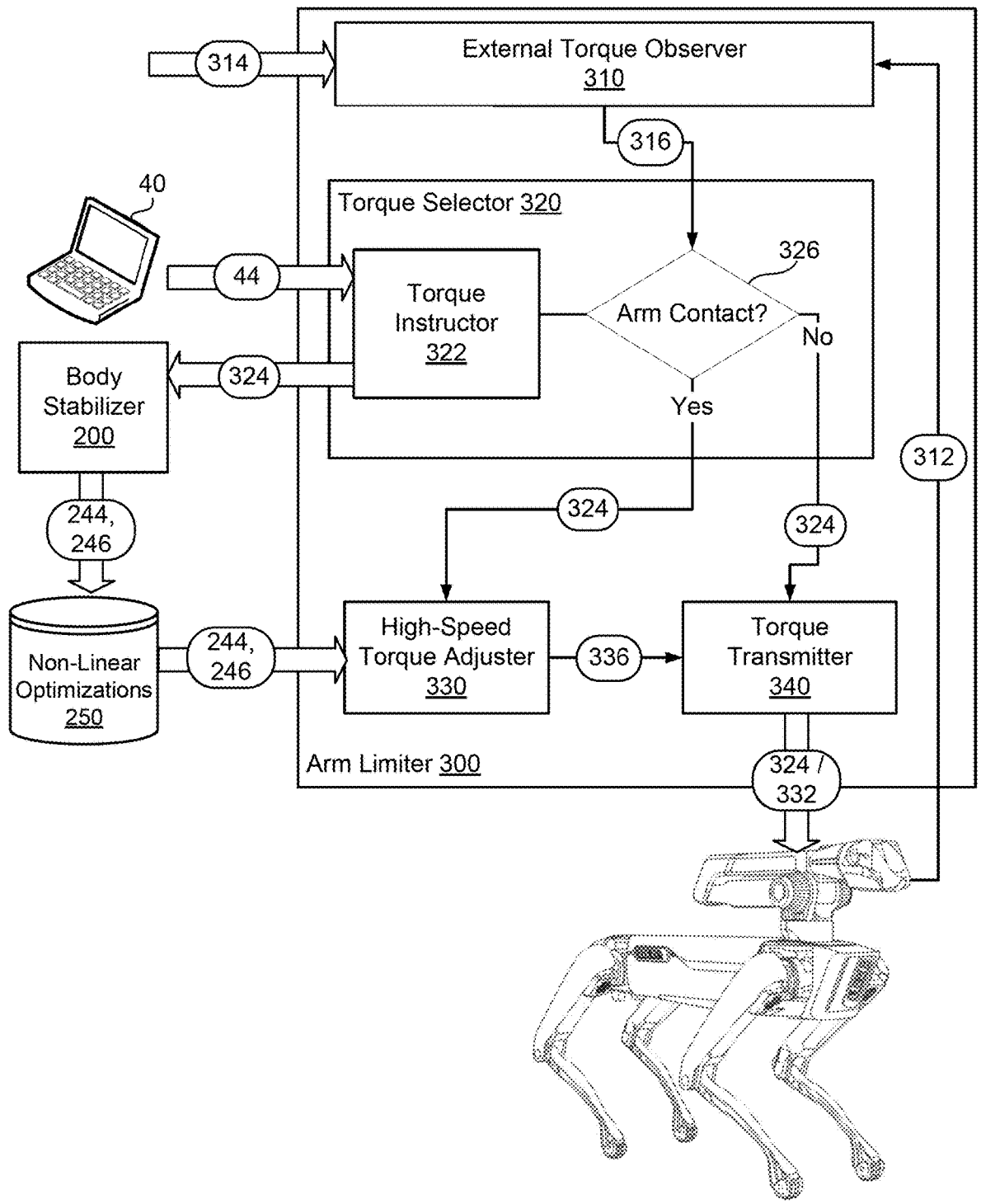
FIG. 3A is a schematic view showing an arm limiter of the arm controller of FIG. 1A.

FIG. 1B and FIG. 3A illustrate the arm limiter 300 of the arm controller 100. The arm limiter 300 includes an external torque observer 310 that determines whether the arm 20 is in contact with an external object by comparing a commanded joint torque set 312 against a corresponding expected joint torque set 314 including expected torque values τexp for the robot arm 20. The arm limiter 300 may include a torque selector 320 configured to receive/determine a requested joint torque set 324 for the arm 20 of robot 10 based on arm movement requests 44. The torque selector 320 is further configured to determine whether the requested joint torque set 324 should be optimized prior to execution by the robot arm 20. When the arm 20 is in contact with an external object, the high-speed torque adjuster 330 executes linear optimization to adjust the requested joint torque set 324 based on a corresponding optimized joint torque set 244. The arm limiter 300 may further include a torque transmitter 340 that sends one of the requested joint torque set 324 or an adjusted joint torque set 336 to the robot arm 20. The arm limiter 300 may execute one or more of the modules 310, 320, 330, 340 at a higher speed (e.g., 1 KHz) than the base stabilizer 200.

Referring now to FIG. 2A, the base evaluator 210 is configured to receive the base configuration data 112 defining a current pose P12 or configuration of the robot base 12. The base configuration data 112 includes configuration data for each leg joint 17, 18. Using the base configuration data 112, the base evaluator 210 determines the current pose P12 of the robot base 12, including the ground-contacting area A19 defined by the feet 19 and the center of gravity CG12 of the robot base 12. The base configuration data 112 may also include measured or estimated friction data for the ground surface associated with the robot base 12. The base evaluator 210 then calculates an allowable base wrench set 212 including all wrench forces that can be applied to the robot base 12 without destabilizing the robot base 12. The wrench forces may be selected based on a base stability metric 204 or threshold defining an allowable amount of movement for the base 12. Thus, when a robot base 12 is in first pose P12 with a relatively large ground-contacting area A19 and/or a low center of gravity CG12, the allowable base wrench set 212 will include a relatively large number of allowable wrench forces corresponding to relatively high stability of the robot base 12. Conversely, when the robot base 12 is in a second pose P12 with a relatively small ground-contacting area A19 and/or a high center of gravity CG12, the allowable wrench set 212 will include a relatively low number of allowable wrench forces corresponding to a relatively low stability of the robot base 12.

In the example shown, the arm evaluator 220 analyzes the allowable base wrench set 212 and calculates an allowable arm force set 222. The allowable arm force set 222 includes all of the forces and torques that can be applied by or to the robot arm 20 for a current arm pose P20 in compliance with the allowable base wrench set 212. In other words, the allowable arm force set 222 includes all of the forces that can be applied to the robot arm 20 without destabilizing the robot base 12. The allowable arm force set 222 may be calculated by executing an adjoint function on the allowable base wrench set 212 to convert the allowable base wrenches 214 to allowable arm forces 224. Thus, as illustrated by FIGS. 2A and 2B, the base wrench set 212 is defined relative to the center of gravity CG12 while the arm force set 222 is defined relative to the end effector 24.

Figure 2B:
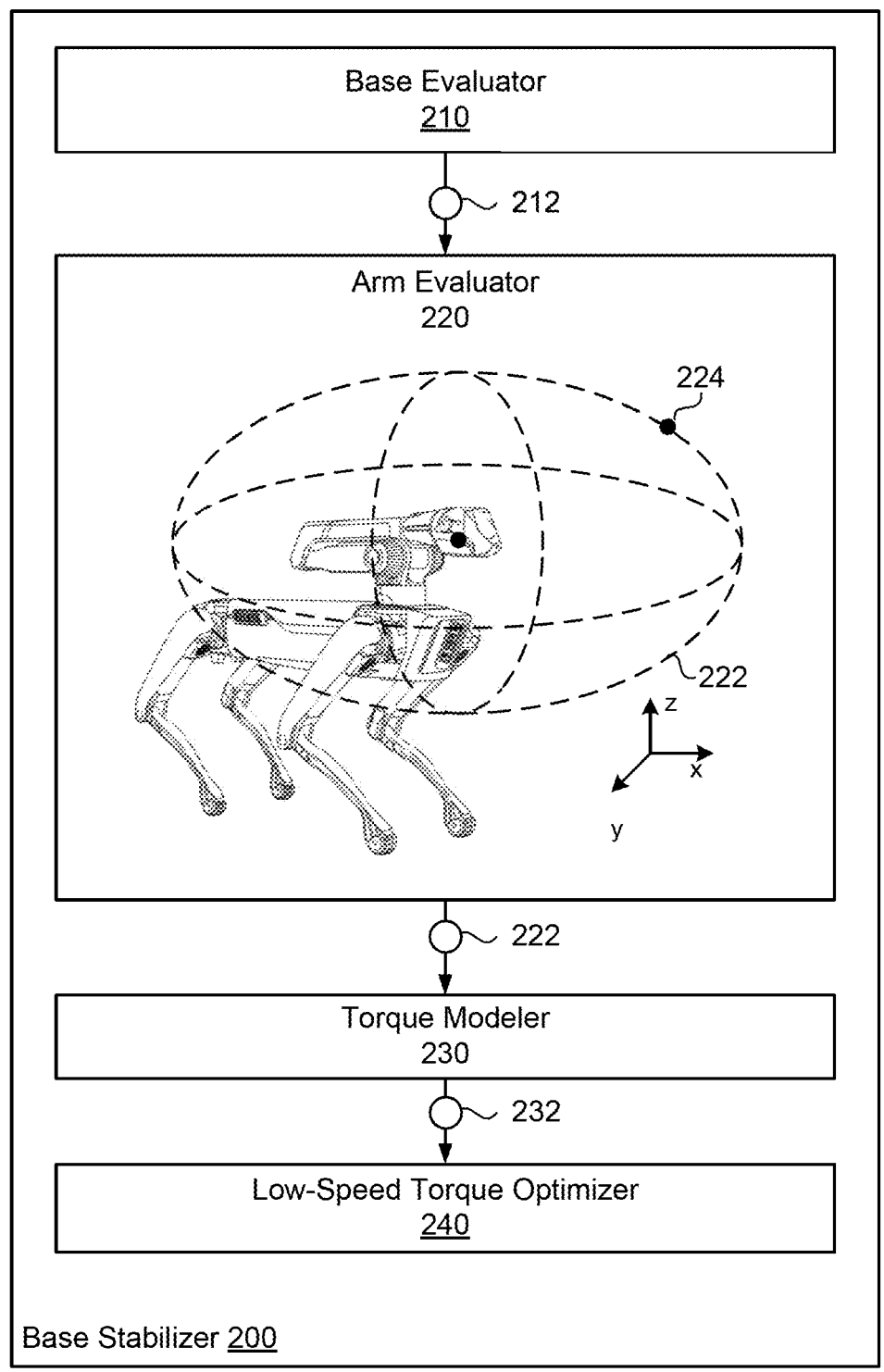
FIG. 2B is a schematic view showing an arm evaluator of the base stabilizer of the arm controller of FIG. 1A.

With continued reference to FIG. 2B, the arm evaluator 220 limits the allowable arm force set 222 to forces that are applied at the end effector 24 of the arm 20. Calculating forces for the end effector 24 results in an allowable arm force set 222. However, in other examples, the arm evaluator 220 may also calculate allowable arm forces along intermediate portions of the robot arm 20 (i.e., between the first joint 26a and the end effector 24).

Figure 2C:
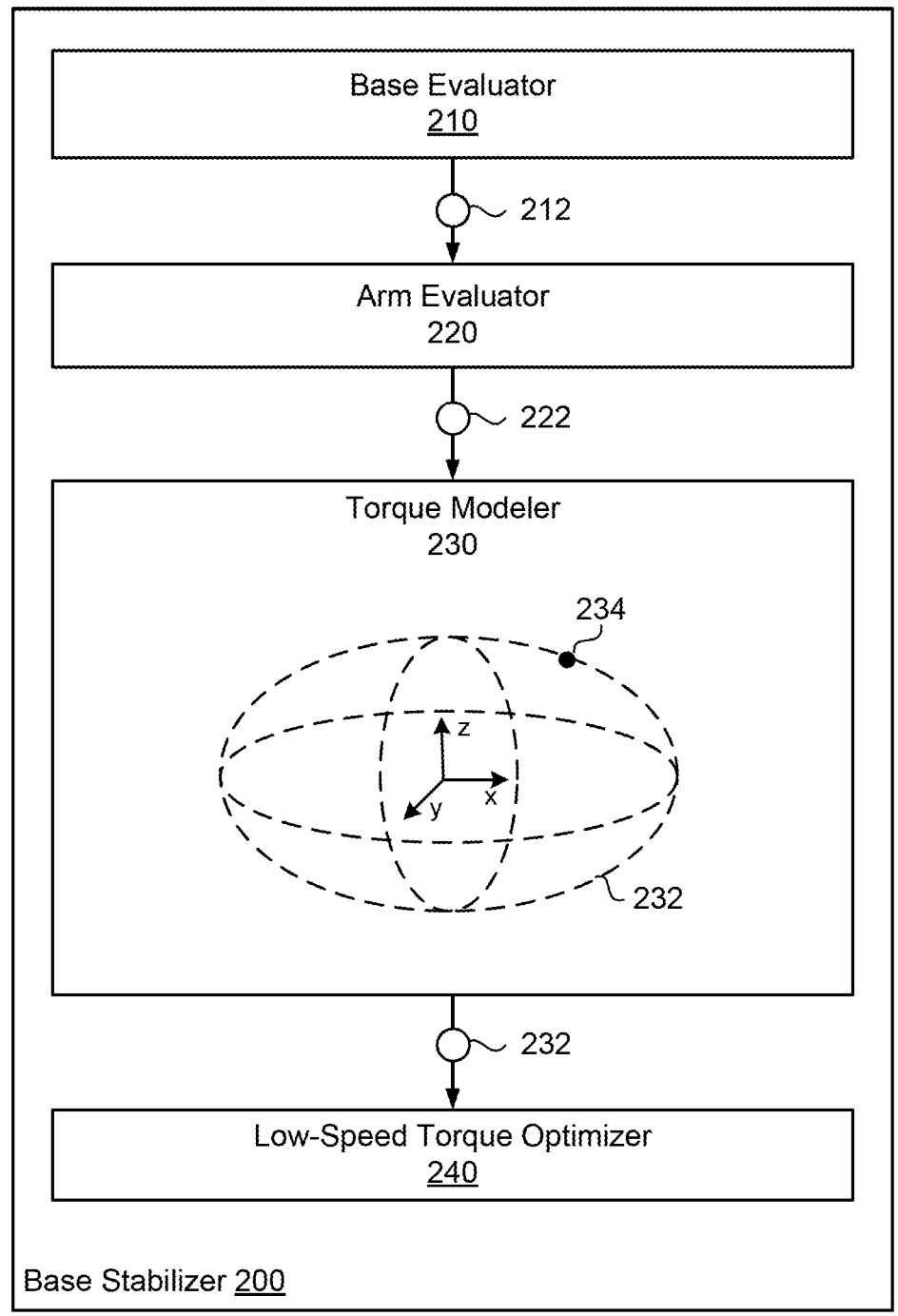
FIG. 2C is a schematic view showing a torque modeler of the base stabilizer of the arm controller of FIG. 1A.
Figure 2D:
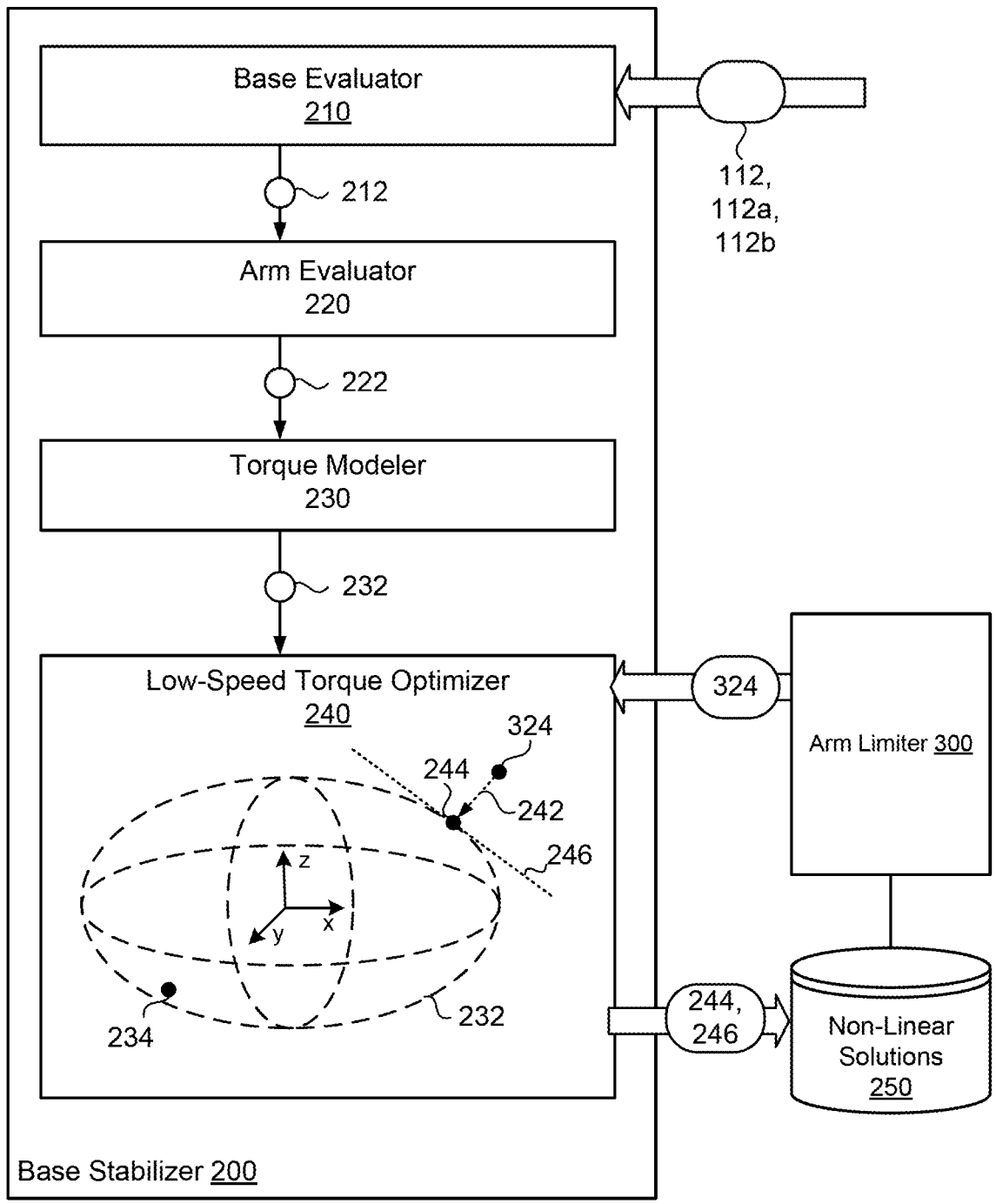
FIG. 2D is a schematic view showing a low-speed torque optimizer of the base stabilizer of the arm controller of FIG. 1A.

The torque modeler 230 of the base stabilizer 200 receives or obtains the allowable arm force set 222 from the arm evaluator 220 and computes a joint-torque-limit model 232. As shown in FIG. 2C, the joint-torque-limit model 232 is represented as an ellipsoid model. However, the joint-torque-limit model 232 may include any convex set of allowable arm joint torques as a result of the model computation executed by the torque modeler 230. The joint-torque-limit model 232 may be calculated using a Jacobian Inverse, Jacobian Pseudo Inverse, or other method to compute the corresponding joint torques given an arm wrench. This method can be used to compute all of the allowable arm joint torque sets 234 that would comply with the allowable arm force set 222 and the allowable base wrench set 212 for the current body pose P12.

As discussed in greater detail below, the low-speed torque optimizer 240 obtains the joint-torque-limit model 232 from the torque modeler 230 and a requested torque set 324 from the arm limiter 300 (FIG. 2D), and then uses the joint-torque-limit model 232 to adjust requested joint torque set 324 to maintain stability of the base 12. Thus, the low-speed torque optimizer 240 is generally configured to calculate an optimized joint torque set 244 corresponding to the requested joint torque set 324, where the optimized joint torque set 244 results in a base wrench that complies with the allowable base wrench set 212 for the current base pose P12.

The low-speed torque optimizer 240 receives a requested joint torque set 324 including requested joint torque values τreq for each joint 26 of the arm 20 corresponding to a requested movement of the arm 20. In the example shown in FIG. 2D, the requested joint torque set 324 includes one or more requested joint torque values τreq that cause the requested joint torque set 324 to fall outside of the joint-torque-limit model 232 represented by the modeled ellipsoid. Thus, the if the requested joint torque set 324 was sent to the arm joints 26, the resulting arm movement would destabilize the base 12.

To prevent instability of the base 12, the low-speed torque optimizer 240 performs an optimization 242 to project the requested joint torque set 324 to the surface of the joint-torque-limit model 232 (i.e., one of the allowable arm joint torque sets 234). In one example, the optimization 244 is done by non-linear mathematical optimization using sequential quadratic programming (SQP). However, other methods of optimization may be executed to project the requested joint torque set 324 to the joint-torque-limit model 232. In calculating the optimized joint torque set 244, the low-speed torque optimizer 240 also calculates local information 246 at the optimized joint torque set 244. For example, the local information 246 may include a hyperplane tangent 246 to the surface of the joint-torque-limit model 232 at the optimized joint torque set 244. The hyperplane tangent 246 for the optimized joint torque set 244 is saved with the optimized joint torque set 244 in storage 250 that is accessible by the arm limiter 300. Because the non-linear optimization 242 used to determine the joint torque sets 244 has a high computational cost and requires relatively long compute times, it is advantageous to execute the non-linear optimization at the low-speed torque optimizer 240 of the base stabilizer 200, which then stores the optimized joint torque set 244 and hyperplane tangent 246 for access by the arm limiter 300.

FIG. 3A shows an overall schematic of the arm limiter 300, which includes the external torque observer 310, the torque selector 320, the high-speed torque adjuster 330, and the torque transmitter 340. Generally, the external torque observer 310 is configured to determine whether or not the robot arm 20 is in contact with an external object, while the torque selector 320 decides whether the torque transmitter 340 should send a requested torque set 324 or an adjusted torque set 332 to the motor controllers of the robot arm joints 26. If the torque selector 320 determines that the adjusted torque set 332 should be provided to the robot arm 20, then the high-speed torque adjuster 330 calculates the adjusted torque set 332 based on the previously-calculated optimized joint torque set 244 and/or the hyperplane tangent 246.

Figure 3B:
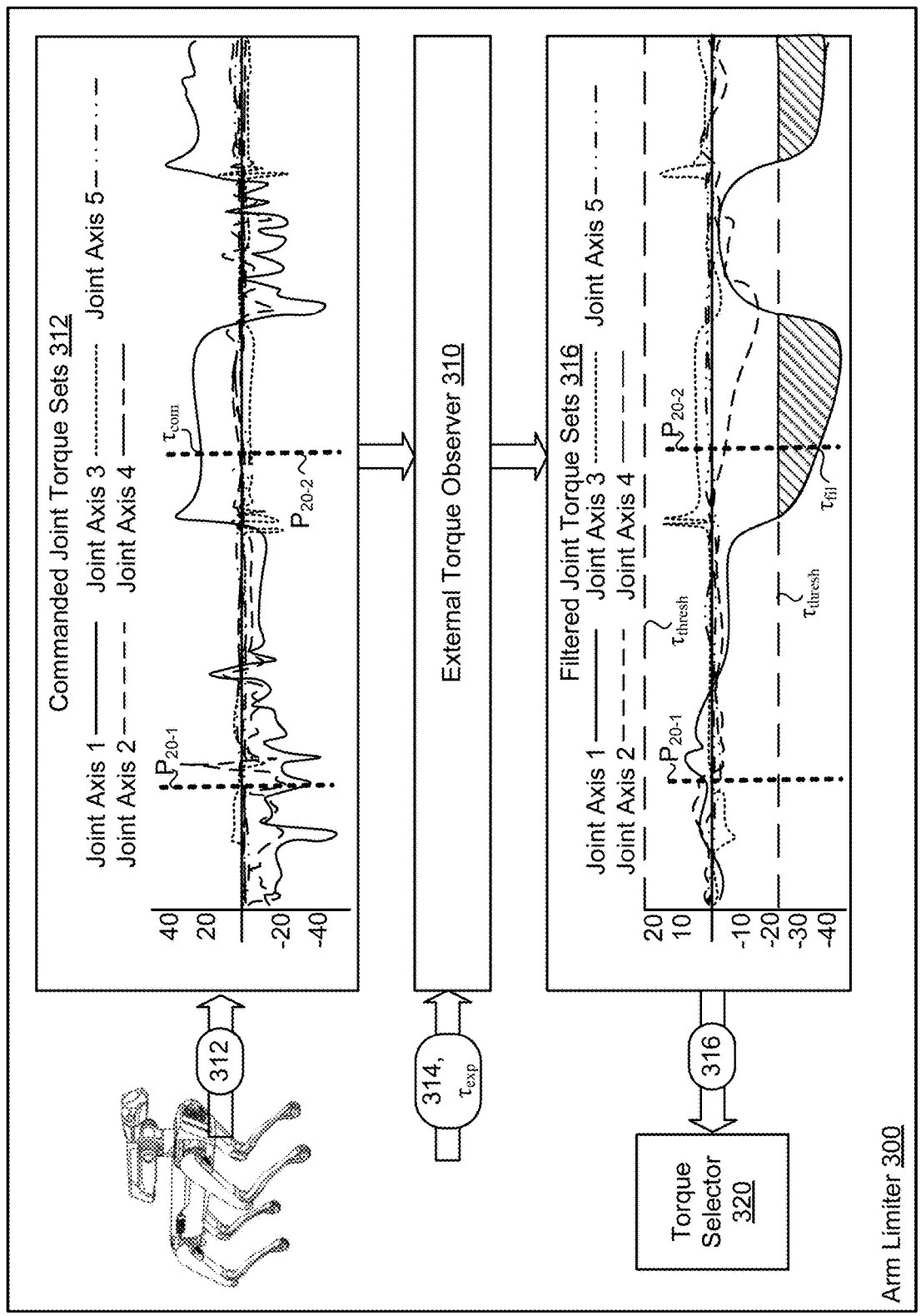
FIG. 3B is a schematic view showing operations of an external torque observer of the arm limiter of FIG. 3A.

FIG. 3B shows the external torque observer 310 receiving a commanded joint torque set 312 from the robot arm 20 for the current arm pose P20. The external torque observer 310 then calculates a filtered joint torque set 316 from the commanded joint torque set 312 based on an expected joint torque set 314. The filtered joint torque set 316 is then forwarded to the torque selector 320 for determining whether the robot arm 20 is in contact with an external object.

In FIG. 3B, the commanded joint torque sets 312 are graphically represented as a function of time. As discussed previously, the robot arm 20 of the present example includes five axes or degrees of freedom. Accordingly, the commanded joint torque sets 312 each include a measured or commanded joint torque value τcom associated with each joint axis. Thus, the illustrated graph of the commanded joint torque sets 312 includes a plotted line for the commanded joint torque value τcom of each joint axis over time. For the sake of discussion, the current example is provided for the commanded joint torque set 312 associated with the arm pose P20-2, as indicated by the vertical dashed line on the graph of the commanded joint torque sets 312. Thus, while the plot of FIG. 3B shows a plurality of commanded joint torque sets 312 over time, the external torque observer 310 actually operates iteratively, and only receives and evaluates a single commanded joint torque set 312 in each iteration.

Referring still to FIG. 3B, the external torque observer 310 also obtains or calculates an expected joint torque set 314 for each pose P20, which includes expected torque values τexp for each joint axis when the robot arm 20 is not in contact with an external object. Thus, the expected joint torque set 314 includes joint torque values τexp attributed to non-contact factors such as Coriolis, gravity, and acceleration. The expected joint torque set 314 may be calculated for each arm pose P20 based on the known characteristics (e.g., weight, size, resistance) and orientations of the robot arm 20. Alternatively, the expected joint torque set 314 may include stored joint torque values τexp obtained or derived based on a history of the measured joint torque values τcom for a given arm pose P20 when the arm is not in contact with an external object.

Using the commanded joint torque set 312 and the expected joint torque set 314, the external torque observer 310 generates a filtered joint torque set 316 for the arm pose P20. Again, FIG. 3B illustrates the filtered joint torque sets 316 graphically as a function of time for the sake of explaining the operations of the external torque observer 310. However, the external torque observer 310 iteratively generates a single filtered joint torque set 316 corresponding to each commanded joint torque set 312. Thus, each joint torque set 312, 316 includes a single set of five torque values τ corresponding to a single iteration of an arm pose P20 (e.g., arm pose P20-1, P20-2).

The filtered joint torque set 316 includes filtered torque values τfil for each joint axis based on a difference between the commanded joint torque values τ¬com of the commanded joint torque set 312 and the expected joint torque values τexp of expected joint torque set 314 for the arm pose P20. Thus, the commanded joint torque value τ¬com for each of the five joint axes is subtracted from the corresponding expected joint torque value τexp for the respective joint axis to generate a filtered joint torque value τfil for the joint axis. Where the robot arm 20 is not in contact with an external object, the commanded joint torque values τ¬com will be substantially similar to the expected joint torque values τexp and the filtered joint torque values τfil will be close to zero (i.e., within a threshold torque value range τthresh to account for dynamics, friction, error, etc.), as shown in the graph for the arm pose P20-1. However, when the robot arm 20 is in contact with an external object, one or more the commanded joint torque values τ¬com of the commanded joint torque value set 312 may be significantly greater than the expected joint torque values τexp of the expected joint torque value set 314, resulting in a filtered joint torque value τfil that exceeds the filtered joint torque value threshold τthresh. For example, as shown in the graph of the filtered joint torque sets 316 in FIG. 3B, the filtered joint torque values τfil for the five axes are within the threshold torque value τthresh for the filtered joint torque set 316 corresponding to the first pose P20-1, while the filtered joint torque values τfil for Joint Axis 1 (solid line) exceeds the threshold torque value τthresh for the filtered joint torque set 316 corresponding to the second pose P20-2. Thus, as discussed below, the first pose P20-1 is associated with a non-contact event and the second pose P20-1 is associated with a contact event.

Referring to FIGS. 3A and 3B, the torque selector 320 includes a torque instructor 322 that receives an arm movement request 44 from the remote device 40 and generates a requested joint torque set 324 including requested joint torque values τreq for executing the arm movement request 44. The number of requested joint torque values τreq included in the requested joint torque set 324 corresponds to the number of axes in the robot 10. Thus, in the present example, each requested joint torque set 324 includes five requested joint torque values τreq each corresponding to a respective one of the five axes of the robot arm 20. As discussed previously, the torque instructor 322 sends the requested joint torque set 324 to the base stabilizer 200, which evaluates the requested joint torque set 324 and generates an optimized joint torque set 244 that is stored for access by the arm limiter 300, as discussed later.

In addition to sending the requested joint torque set 324 to the base stabilizer 200 for optimization, the torque selector 320 includes a decision block 326 for deciding whether the requested joint torque set 324 needs adjustment or can be sent directly to the robot arm 20 for execution. The torque selector 320 receives the filtered joint torque set 316 from the external torque observer 310 and evaluates the filtered joint torque set 316 to determine whether any of the filtered joint torque values τfil exceeds the filtered joint torque value threshold τthresh, indicating that one or more of the arm axes are in contact with an external object. While the present example shows the torque selector 320 determining whether there is arm contact at the decision block 326, in other examples, the external torque observer 310 may determine whether the robot arm 20 is in contact based on the filtered joint torque set 316 and then send a notification to the torque selector 320 identifying whether the robot arm 20 is in contact or free-moving.

The physics of the robot arm 20 change based on whether the robot arm 20 is contacting an external object within the environment 2. For example, the robot arm 20 may be more likely to destabilize the base 12 when the robot arm 20 is in contact with an external object than when the robot arm 20 is not in contact with an external object. Accordingly, the torque selector 320 is generally configured to determine whether the requested torque values τreq should be limited based on whether the robot arm 20 is in contact with an external object, and may select between no limit or a first limit when the robot arm 20 is not in contact with an external object and a second limit when the robot arm 20 is in contact with an external object.

When the torque selector 320 determines or is instructed that the robot arm 20 is not in contact with an external object (i.e., response at block 326 is "no"), the torque selector 320 may send the requested joint torque set 324 directly to the torque transmitter 340 for forwarding to the robot arm 20. Thus, when the robot arm 20 is not in contact with an external object and is free to move about each of the joint axes, the torque selector 320 may allow unlimited requested torque values τreq to be applied to the robot arm 20. In some implementations, the arm limiter 300 includes a second high-speed torque adjuster substantially similar to the first high-speed torque limiter 330 that limits torques when the robot arm 20 is not in contact with an external object. This optional second high-speed torque adjuster is configured to minimize instability caused by accelerating the robot arm 20 fast enough to destabilize the base 12.

When the torque selector 320 determines or is instructed that the robot arm 20 is in contact with an external object (i.e., the response at block 326 is "yes"), the torque selector 320 sends the requested joint torque set 324 to the high-speed torque adjuster 330 for adjustment. Thus, when the robot arm 20 is in contact with an external object, one or more of the requested joint torque values τreq may need to be limited to maintain stability at the base 12.

Figure 3C:
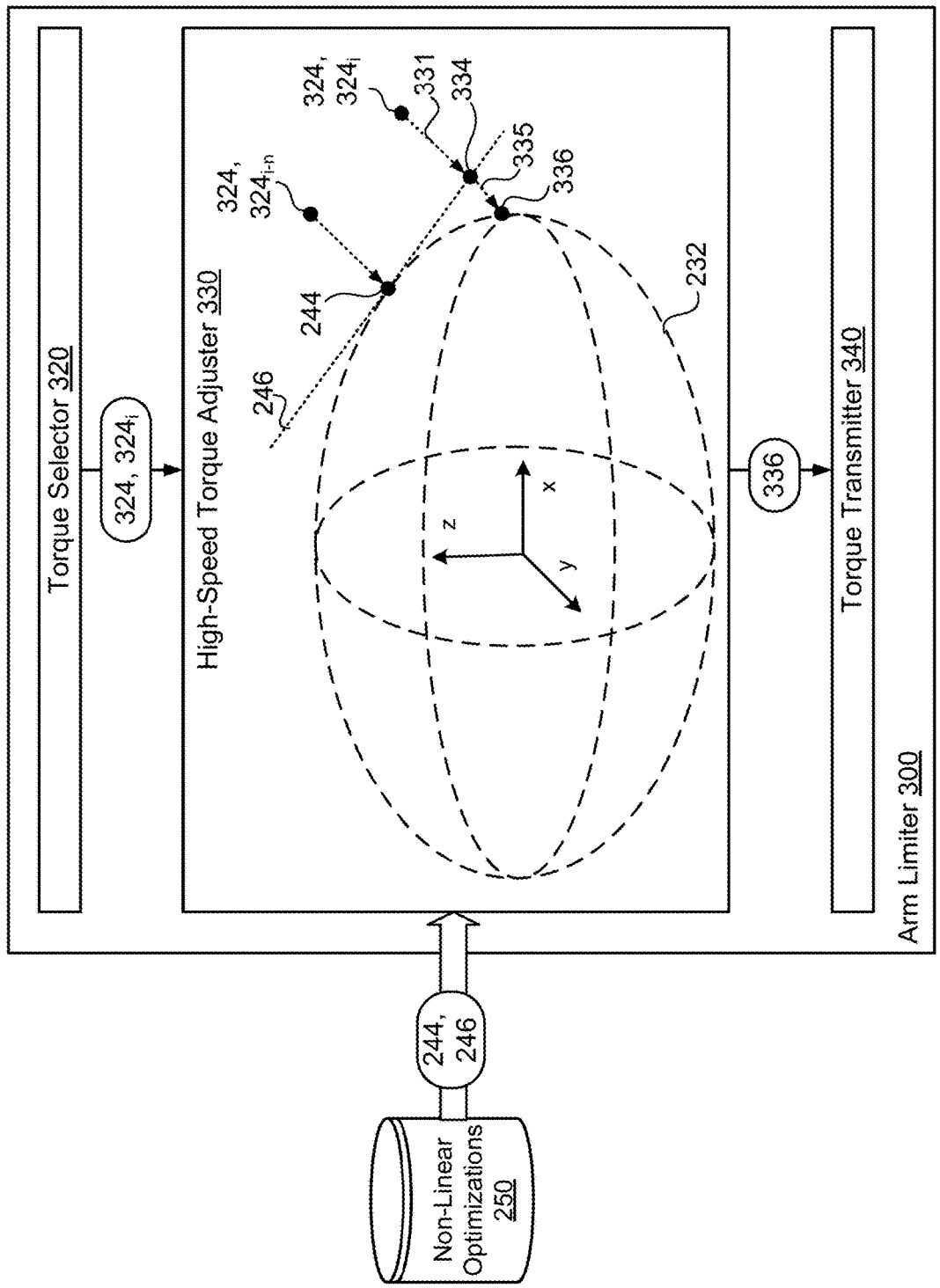
FIG. 3C is a schematic view showing a high-speed torque adjuster of the arm limiter of FIG. 3A.

FIG. 3C shows an example operation of the high-speed torque adjuster 330 for limiting the requested joint torque set 324. Here, the high-speed torque adjuster 330 receives a requested joint torque set 324i for a current iteration corresponding to the current arm pose P20-2 of the robot arm 20 and executes adjustments 331, 335 based on a previously-calculated optimized joint torque set 244 and corresponding hyperplane tangent 246 stored by the base stabilizer 200. The high-speed torque adjuster 330 further executes a coarse torque adjustment 331 to project the requested joint torque set 324i to a closest point 334 on a hyperplane tangent 246. The point 334 represents a coarse adjustment joint torque set 334 including coarse adjustment joint torque values τCA that are based on a set of a hyperplane tangent 246 and optimized joint torque set 244 having the closest model-space relationship to the requested joint torque set 324i within the joint-torque-limit model 232.

As shown in FIG. 3C, the coarse adjustment joint torque set 334 may still not satisfy the joint-torque-limit model 232 such that the coarse adjustment joint torque set 334 would result in some instability in the base 12 if sent to the arm 20. Accordingly, after coarse torque adjustment 331, the high-speed torque adjuster 330 may execute a second, fine torque adjustment 335 to project the coarse adjustment joint torque set 334 onto the surface of the joint-torque-limit model 232. In one example, the fine torque adjustment 335 includes executing a level-set projection from the hyperplane tangent 246 to the closest point (i.e., one of the allowable arm joint torque sets 234) on the surface of the joint-torque-limit model 232 to generate a fine adjusted joint torque set 336 for the current iteration of the requested joint torque set 324i. Thus, the high-speed torque adjuster 330 utilizes the computationally-intensive optimized joint torque set 244 previously calculated by the base stabilizer 200 to quickly project 331, 335 the requested joint torque set 324i to the surface of the joint-torque-limit model 232.

Returning back to FIG. 3A, torque transmitter 340 receives or obtains the requested joint torque set 324 from the torque selector 320 when the robot arm 20 is not in contact with an external object (i.e., answer at block 326 is "no") and receives or obtains the adjusted joint torque set 336 from the high-speed torque adjuster 330 when the robot arm 20 is in contact with an external object (i.e., answer at block 326 is "yes"). The torque transmitter 340 then sends the received joint torque set 324, 336 to the robot arm 20 and the robot arm 20 executes the corresponding movement request 44 using the received joint torque set 324, 336.

Figure 4:
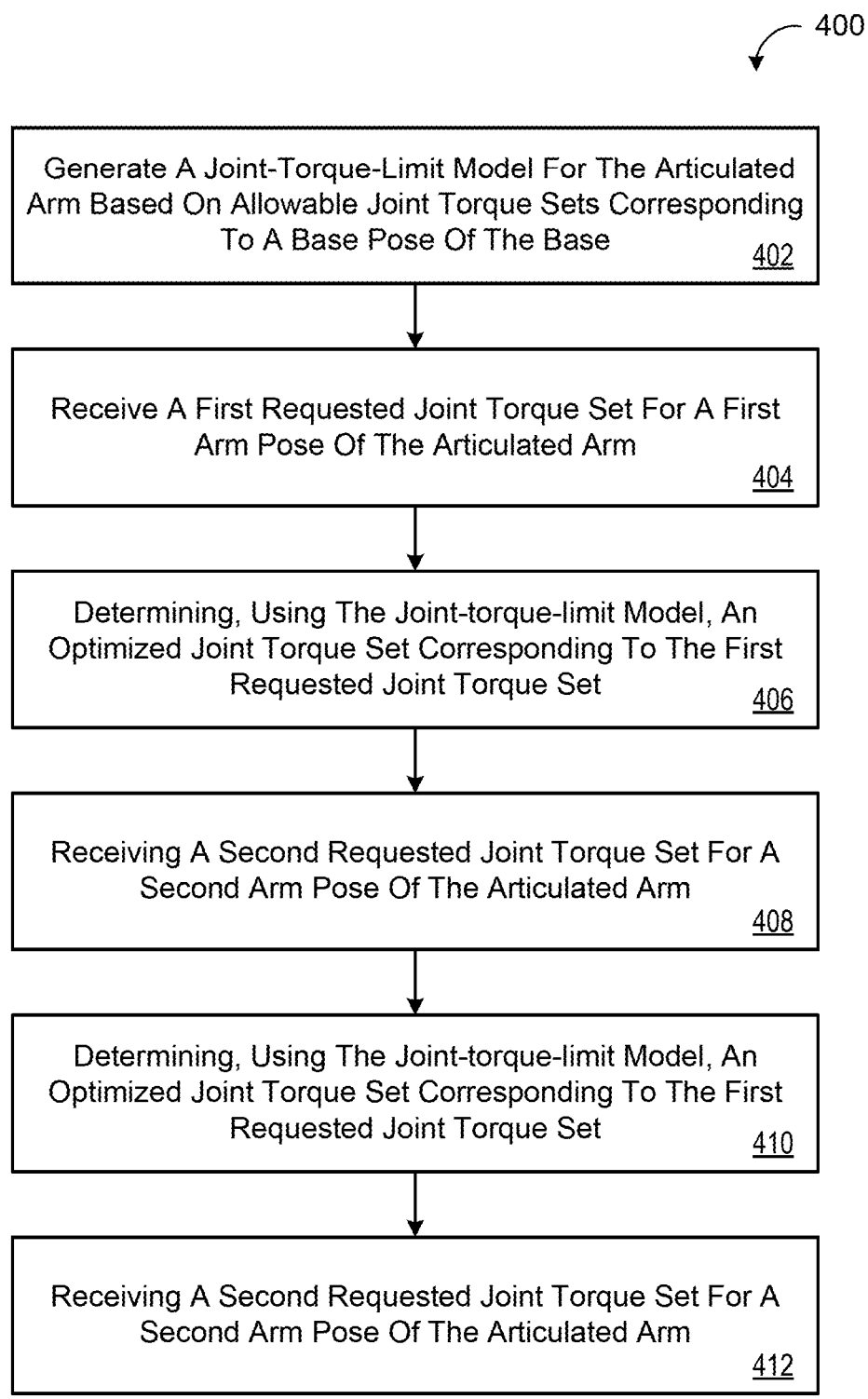
FIG. 4 is a flowchart of an example arrangement of operations for a method of limiting arm forces in a robot arm.

FIG. 4 is a flowchart of an example arrangement of operations for a method 400 for limiting joint torques in the robot arm 20. The method 400 may be a computer implemented method executed by data processing hardware of the robot 10, which causes the data processing hardware to perform operations. At operation 402, the method 400 includes generating a joint-torque-limit model 232 for the articulated arm 20 based on allowable joint torque sets 234 corresponding to a base pose P¬12 of the base 12. At operation 404, the method 400 includes receiving a first requested joint torque set 324 for a first arm pose P20 of the articulated arm 20. At operation 406, the method 400 includes determining, using the joint-torque-limit model 232, an optimized joint torque set 244 corresponding to the first requested joint torque set 324. The method 400 further includes, at operation 408, receiving a second requested joint torque set 324 for a second arm pose P20 of the articulated arm 20. At operation 410, the method 400 generates an adjusted joint torque set 336 by adjusting 331, 335 the second requested joint torque set 324 based on the optimized joint torque set 244. At operation 412, the method 400 sends the adjusted joint torque set 336 to the articulated arm 20.

Figure 5:
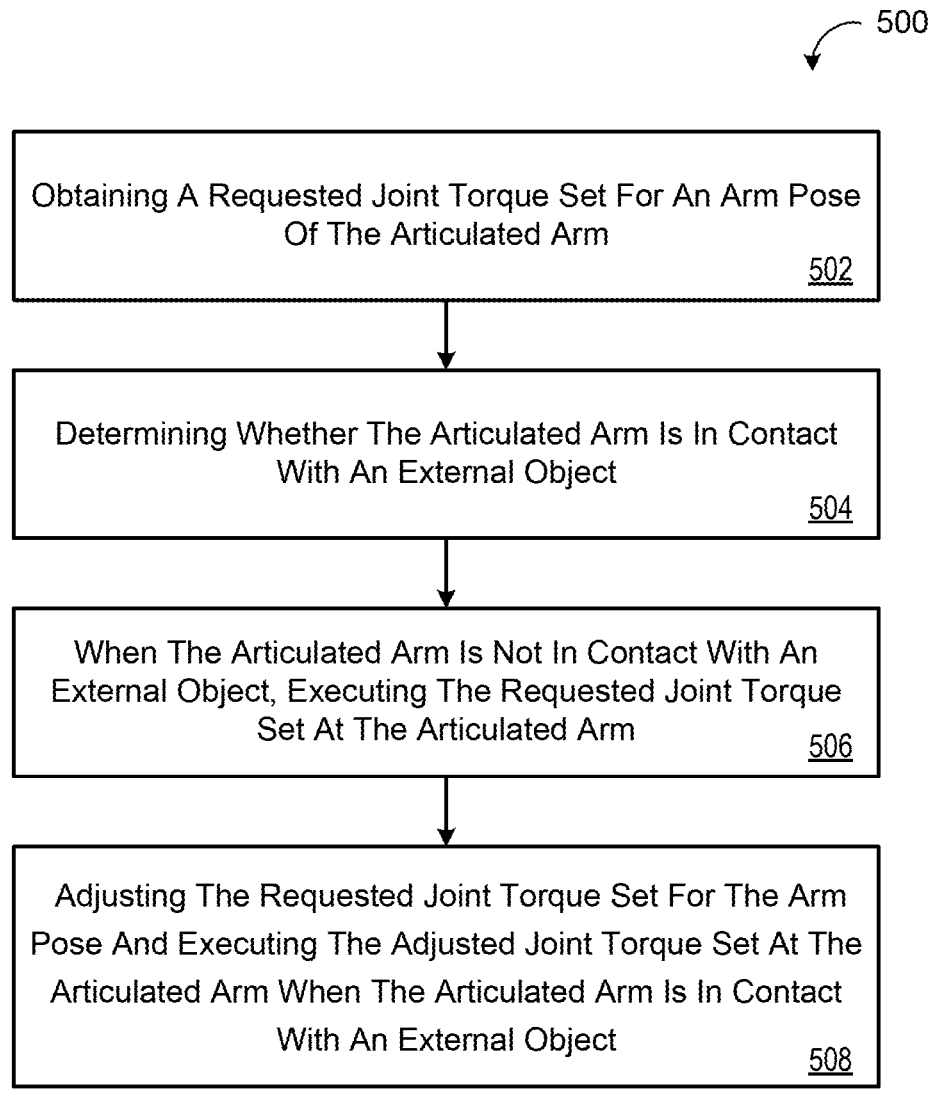
FIG. 5 is a flowchart of an example arrangement of operations for a method of limiting arm forces in a robot arm.

FIG. 5 is a flowchart of an example arrangement of operations of a method 500 for limiting joint torques of the articulated arm 20 of the robot 10 based on whether the articulated arm 20 is in contact with an external object. The method 500 may be a computer implemented method executed by data processing hardware of the robot 10, which causes the data processing hardware to perform operations. At operation 502, the method 500 obtains a requested joint torque set 324 for an arm pose P20 of the articulated arm 20. At operation 504, the method 500 determines whether the articulated arm 20 is in contact with an external object. At operation 506, when the articulated arm 20 is not in contact with an external object, the method 500 includes executing the requested joint torque set at the articulated arm. At operation 508, when the articulated arm is in contact with an external object, the method 500 includes adjusting the requested joint torque set 324 for the arm pose P20 and executing the adjusted joint torque set 336 at the articulated arm 20.

Figure 6:
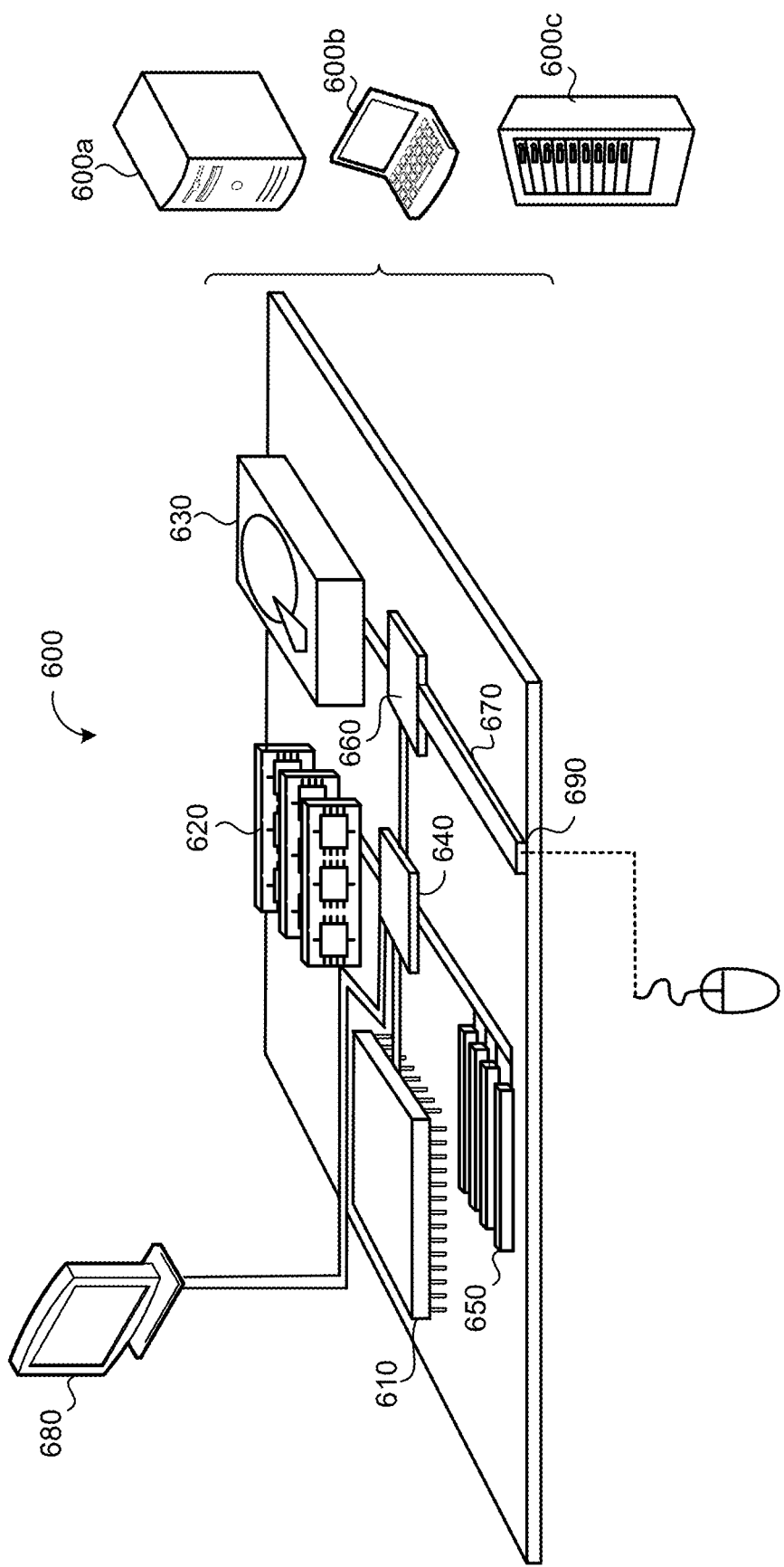
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 660, which may accept various expansion cards (not shown). In some implementations, the low-speed controller 660 is coupled to the storage device 630 and a low-speed expansion port 660. The low-speed expansion port 660, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method that, when executed by data processing hardware of a robot including an articulated arm attached to a base, causes the data processing hardware to perform operations comprising:
    receiving a first configuration of the base;
    determining a set of torques that can be applied to the base in the first configuration to satisfy a base stability metric, the base stability metric defining a threshold amount of movement of the base from the first configuration;
    generating a joint-torque-limit model for the articulated arm based on the determined set of torques that can be applied to the base;
    receiving a first requested joint torque set for a first arm pose of the articulated arm;
    determining a first adjusted joint torque set based on the first requested joint torque set such that the first adjusted joint torque set is within the joint-torque-limit model; and
    controlling the articulated arm based on first adjusted joint torque set.

2. The method of claim 1, wherein the base comprises a mobile base, wherein the operations further comprise:
    receiving a first pose of the mobile base including a center of gravity and a ground contact area of the mobile base;
    wherein determining the set of torques that can be applied to the base is further based on the center of gravity and the ground contact area of the mobile base in the first pose.

3. The method of claim 1, wherein:
    generating the joint-torque-limit model comprises determining a set of wrench forces for the base in the first configuration that satisfy the base stability metric; and
    generating the joint-torque-limit model is further based on the set of wrench forces for the base.

4. The method of claim 1, wherein determining the first adjusted joint torque set comprises projecting the first requested joint torque set to the joint-torque-limit model.

5. The method of claim 1, wherein the operations further comprise determining local information for the joint-torque-limit model at the first requested joint torque set.

6. The method of claim 5, wherein generating the first adjusted joint torque set comprises:
    obtaining the first requested joint torque set and the local information;
    executing a coarse torque adjustment using the local information to project the first requested joint torque set to a coarse adjustment joint torque set; and
    executing a fine joint torque adjustment to project the coarse adjustment joint torque set to the joint-torque-limit model.

7. The method of claim 5, wherein the local information includes a hyperplane tangent to a surface of the joint-torque-limit model at the first requested joint torque set.

8. A system for a robot including an articulated arm attached to a base, the system comprising:
    data processing hardware; and
    memory hardware in communication with the data processing hardware, the memory hardware storing instructions that when executed on the data processing hardware cause the data processing hardware to perform operations comprising:
        receiving a first configuration of the base;
        determining a set of torques that can be applied to the base in the first configuration to satisfy a base stability metric, the base stability metric defining a threshold amount of movement of the base from the first configuration;
        generating a joint-torque-limit model for the articulated arm based on the determined set of torques that can be applied to the base;
        receiving a first requested joint torque set for a first arm pose of the articulated arm;
        determining a first adjusted joint torque set based on the first requested joint torque set such that the first adjusted joint torque set is within the joint-torque-limit model; and
        controlling the articulated arm based on first adjusted joint torque set.

9. The system of claim 8, wherein the base comprises a mobile base, wherein the operations further comprise:
    receiving a first pose of the mobile base including a center of gravity and a ground contact area of the mobile base;
    wherein determining the set of torques that can be applied to the base is further based on the center of gravity and the ground contact area of the mobile base in the first pose.

10. The system of claim 8, wherein:
    generating the joint-torque-limit model comprises determining a set of wrench forces for the base in the first configuration that satisfy the base stability metric; and
    generating the joint-torque-limit model is further based on the set of wrench forces for the base.

11. The system of claim 8, wherein determining the first adjusted joint torque set comprises projecting the first requested joint torque set to the joint-torque-limit model.

12. The system of claim 8, wherein the operations further comprise determining local information for the joint-torque-limit model at the first requested joint torque set.

13. The system of claim 12, wherein generating the first adjusted joint torque set comprises:
    obtaining the first requested joint torque set and the local information;
    executing a coarse torque adjustment using the local information to project the first requested joint torque set to a coarse adjustment joint torque set; and
    executing a fine joint torque adjustment to project the coarse adjustment joint torque set to the joint-torque-limit model.

14. The system of claim 12, wherein the local information includes a hyperplane tangent to a surface of the joint-torque-limit model at the first requested joint torque set.

15. A computer-implemented method that, when executed by data processing hardware of a robot including an articulated arm attached to a base, causes the data processing hardware to perform operations comprising:
    receiving a first configuration of the base;
    determining a set of torques that can be applied to the base in the first configuration to satisfy a base stability metric, the base stability metric defining a threshold amount of movement of the base from the first configuration;
    generating a joint-torque-limit model for the articulated arm based on the determined set of torques that can be applied to the base;
    receiving a first requested joint torque set for a first arm pose of the articulated arm;
    determining a first adjusted joint torque set based on the first requested joint torque set such that the first adjusted joint torque set is within the joint-torque-limit model; and controlling the articulated arm based on first adjusted joint torque set.

16. The method of claim 15, wherein the base comprises a mobile base, wherein the operations further comprise:
receiving a first pose of the mobile base including a center of gravity and a ground contact area of the mobile base;
wherein determining the set of torques that can be applied to the base is further based on the center of gravity and the ground contact area of the mobile base in the first pose.

17. The method of claim 15, wherein:
generating the joint-torque-limit model comprises determining a set of wrench forces for the base in the first configuration that satisfy the base stability metric; and
generating the joint-torque-limit model is further based on the set of wrench forces for the base.

18. The method of claim 15, wherein determining the first adjusted joint torque set comprises projecting the first requested joint torque set to the joint-torque-limit model.

19. The method of claim 15, wherein the operations further comprise determining local information for the joint-torque-limit model at the first requested joint torque set.

20. The method of claim 19, wherein generating the first adjusted joint torque set comprises:
obtaining the first requested joint torque set and the local information;
executing a coarse torque adjustment using the local information to project the first requested joint torque set to a coarse adjustment joint torque set; and
executing a fine joint torque adjustment to project the coarse adjustment joint torque set to the joint-torque-limit model.

* * * * *